Jan. 19, 1960  A. L. HEDRICH ET AL  2,921,467
FLOWMETER COMPENSATION FOR PROPAGATION VELOCITY CHANGES
Filed Aug. 21, 1957

INVENTORS
ALBERT L. HEDRICH
DON R. PARDUE

United States Patent Office 2,921,467
Patented Jan. 19, 1960

2,921,467

FLOWMETER COMPENSATION FOR PROPAGATION VELOCITY CHANGES

Albert L. Hedrich, Bethesda, and Don R. Pardue, Silver Spring, Md., assignors to the United States of America as represented by the Secretary of the Army Application August 21, 1957, Serial No. 679,545

2 Claims. (Cl. 73—194)

(Granted under Title 35, U.S. Code (1952), sec. 266)

The invention described herein may be manufactured and used by or for the Government for governmental purposes without the payment to us of any royalty thereon.

This invention relates to apparatus for measuring the rate of flow of a medium by means of a sound wave that is transmitted over a fixed distance between a transmitter and receiver in which the transmitter and receiver are interchanged without varying their location. More particularly, this invention relates to a flowmeter system of the type described in which means are provided to compensate for propagation velocity changes in the fluid medium.

The present invention is an improvement of the flowmeter described in Patent No. 2,724,269 issued on November 22, 1955, entitled "Apparatus for Measuring Flow." As described in that patent, means are provided for measuring the rate of flow of a fluid medium by sending a sound wave in alternate directions between two transducers mounted in spaced relation with respect to the direction of fluid flow and measuring the difference between the time of travel of the sound waves in each direction.

Operation of the flowmeter system of the above-identified patent has been found to be very dependent upon the propagation velocity of the fluid medium. Propagation velocity changes upset the calibration and interfere with the proper operation of the flowmeter. Changes in temperature are the chief cause of changes in propagation velocity. The measurement of the flow of a fluid medium whose temperature varies any appreciable degree can not therefore be accurately and reliably accomplished with this flowmeter.

Accordingly, it is an object of the present invention to provide means for reducing the adverse effects caused by changes in the propagation velocity on the operation of a flowmeter of the type described.

Our invention accomplishes this object by providing electrical means for keeping constant the distance between transmitter and receiver, measured in wavelengths of the transmitted sound wave, irrespective of the propagation velocity of the fluid medium. One example of such means changes the frequency of the transmitted signal in such a manner so as to maintain constant the phase delay between transmitter and receiver signals irrespective of the propagation velocity of the fluid medium.

The specific nature of the invention as well as other objects, uses and advantages thereof will clearly appear from the following description and from the accompanying drawing, in which.

Figure 1:
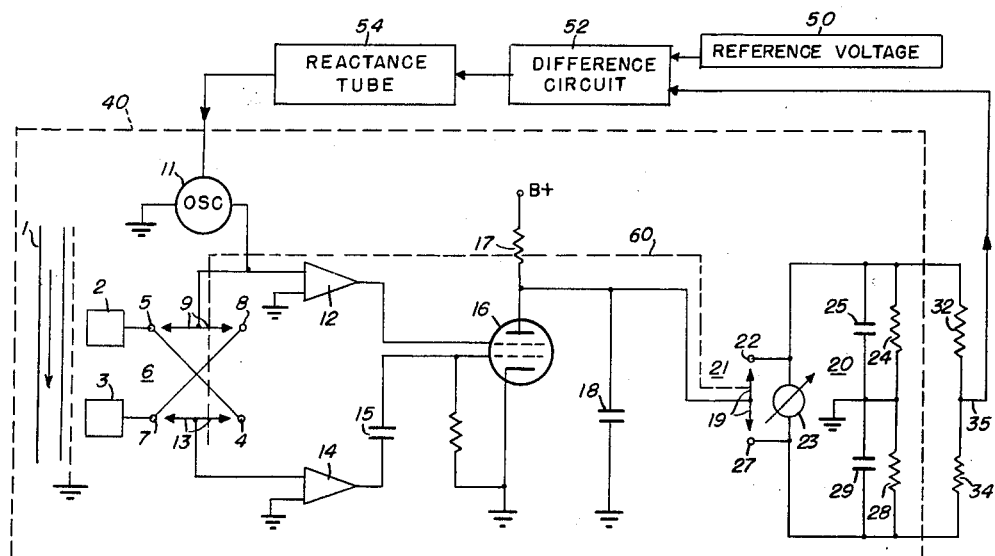
Figure 1 is a schematic diagram of an improved flowmeter system in accordance with our invention.
Figure 2:
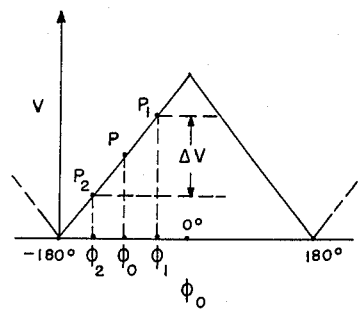
Figure 2 is a plot of the voltage on the synchronizer filter networks versus the no-flow phase angle difference between transmitter and receiver showing operation of the flowmeter system for a preferred operating point.

Referring to Figure 1, the apparatus within the dashed line 40 is the flowmeter system shown in Figure 2 of Patent No. 2,724,269. The diagram is slightly rearranged in order to better illustrate our invention. It is to be understood that the description and operation of the apparatus within the dashed line 40 is as described in the above-identified patent. Our invention will be described in connection with this particular flowmeter system, but our invention is also applicable to any flowmeter system of this type where changes in propagation velocity of the medium produce adverse effects on system operation.

The operation of the apparatus within the dashed lines of Figure 1 may be briefly summarized as follows. Two piezoelectric crystals 2 and 3 are pressed against a conduit 1 through which the medium flows with a velocity $v$. The crystals 2 and 3 are alternately operated as transmitter and receiver by means of the switch 6. An oscillator 11 acts as a source for the transmitter signal and the received signal is fed to a limiting amplifier 14. A measurement of the phase angle difference between the upstream and downstream signals is obtained by alternately comparing the two signals with the signal output from the oscillator 11. The voltage output of the oscillator 11 is amplified and limited by the limiting amplifier 12 and then applied to the second grid of the coincidence tube 16. The output of the limiting amplifier 14, to which the received signal is fed, is applied to the first grid of the coincidence tube 16. Current flows in the tube only when these two signals appear simultaneously on the grids of the tube 16. The output obtained from the tube 16 is a pulse having a constant amplitude and a width determined by the phase angle difference between the transmitted and received signals. In the presence of flow the width of the pulse for the upstream connection of the switch 6 will be different from the downstream connection of the switch 6. The integrating circuit 17, 18 produces a signal having an average voltage which is proportional to the width of the pulse. At the output of the integrating circuit 17, 18 therefore, the average value of the signal will alternate between two values, the signal having one average value for the upstream connection of the switch 6 and another average value for the downstream connection of the switch 6. The difference between these two average values is a measure of the phase angle difference between the upstream and downstream signals. If it is desired to read the average voltage difference directly across a meter, the synchronous rectifier 20 may be used. The movable contact 19 of the switch 21 is synchronized with the movable contacts 9 and 13 of the switch 6 as shown by the dashed line 60 so that each parallel resistor-capacitor filter 28, 29 and 24, 25 will have a voltage corresponding to one of the average voltages values. A meter 23 connected across the two filter networks will thus indicate the difference between the two voltages.

Knowing the phase angle difference between the upstream and downstream signals, it is possible to calculate the velocity of flow of the medium from the following equation (Equation 7 of column 4 of Patent No. 2,724,269):

$$\Delta\phi_1 - \Delta\phi_2 = 2w\frac{vD}{c^2} \tag{1}$$

Where $\Delta\phi_1$ is the phase angle difference between transmitter and receiver signals in the upstream direction, $\Delta\phi_2$ is the phase angle difference between transmitter and receiver signals in the downstream direction, $w$ is the angular frequency, $D$ is the distance between transmitter and receiver, $c$ is the propagation velocity of the medium, and $v$ is the velocity of flow.

The effects of changes in propagation velocity on the operation of the above-described flowmeter system will now be analyzed. One adverse effect is evident from Equation 1. Since the phase angle difference between the upstream and downstream signals is inversely proportional to the square of the propagation velocity, $c^2$, changes in propagation velocity will upset the calibration of the flowmeter. In our invention we provide partial compensation by providing means for keeping constant the distance between transmitter and receiver measured in wavelengths of the transmitted sound wave. The physical spacing $D$ can be expressed in terms of the spacing in wavelengths $D_\lambda$, the propagation velocity $c$, and the frequency $f$ as follows:

$$D = \frac{D_\lambda}{f} c \qquad (2)$$

Substituting Equation 2 for $D$ in Equation 1 gives:

$$\Delta\phi_1 - \Delta\phi_2 = \frac{w D_\lambda v}{c} \qquad (3)$$

Equation 3 shows that $\Delta\phi_1 - \Delta\phi_2$ is now inversely proportional to $c$ instead of $c^2$ thereby partially compensating for changes in $c$.

Changes in the propagation velocity of the medium also cause a second and more serious effect on flowmeter operation. This effect is not readily apparent and requires a more detailed discussion.

In the absence of flow the same voltage will appear on both filter networks of the synchronous rectifier 20. The magnitude of this voltage is dependent upon the no-flow phase angle difference between transmitter and receiver signals. An analysis of flowmeter operation gives the plot of Figure 2 showing the magnitude of the no-flow voltage on the filter networks versus the no-flow phase angle between transmitter and receiver. This no-flow phase angle can be represented by the following equation:

$$\Delta\phi_{no\ flow} = \phi_0 = \frac{wD}{c} \qquad (4)$$

where $w$, $D$ and $c$ are the same quantities described in connection with Equation 1. Equation 4 shows that $\phi_0$ varies inversely with changes in the propagation velocity $c$.

Assume now that initially the value of $$\frac{wD}{c}$$

is such that the no-flow phase angle $\phi_0$ is at point P in Figure 2. When flow occurs the phase angle difference between transmitter and receiver for the upstream flow position of the switch 6 will increase by an amount dependent upon the flow velocity, while for the downstream position of the switch the phase angle difference will decrease by the same amount. In Figure 2 assume that the upstream phase angle difference is $\phi_1$, and the downstream phase angle difference $\phi_2$. For the values of $\phi_1$ and $\phi_2$ shown the voltages on the filter networks will have increased and decreased to $P_1$ and $P_2$ respectively, the difference between these voltages $\Delta V$ being a measure of the flow velocity. It can be seen therefore that for an initial operating point at P, a wide range of flow velocities can be measured because of the large linear range available.

Figure 3:
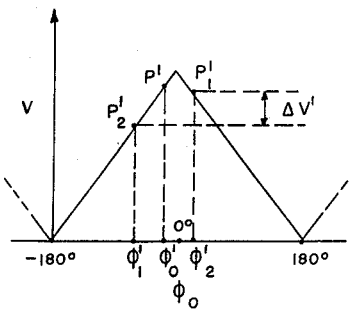
Figure 3 is the same plot as in Figure 2 showing operation of the flowmeter system for an undesirable operating point.

If the propagation velocity $c$ is allowed to change, the value of the no-flow phase angle $\phi_0$ changes in accordance with Equation 4 and the operating point P might move anywhere along the curve. Figure 3 shows what occurs if the point P moves to a position P' near the apex of the curve. If the flow is the same as before and the upstream and downstream phase angle differences are now represented by $\phi_1'$ and $\phi_2'$ the voltages on the filter networks in the presence of flow will now have the values given by points $P_1'$ and $P_2'$. It can readily be seen that the difference between these voltages $\Delta V'$ will give an incorrect reading because the linear range of operation has been exceeded. If the point P is allowed to move freely along the curve as a result of propagation velocity, $c$ changes therefore, it will never be known whether the difference voltage read by the meter 23 in Figure 1 is the correct value, or is incorrect as in Figure 3 because the linear range is exceeded. This is a serious problem because small changes in propagation velocity, due to temperature changes for example, may cause a considerable movement of the point P along the curve. By keeping constant the distance between transmitter and receiver, measured in terms of wavelengths, our invention keeps the operating point constant and thus completely solves the above problem.

Various means for keeping constant the wavelength distance between transmitter and receiver may be employed in accordance with our invention. One example of such means is shown in Figure 1. Equal resistors 32 and 34 are connected in series across the meter 23. The voltage at the center point 35 will be dependent only upon the no-flow voltage on the filter networks irrespective of the velocity of flow of the medium. This may be seen from the following example. Assume that the no-flow voltage on the filter networks is 10 volts. The voltage at the center point 35 will then also be 10 volts. In the presence of flow the voltage on one filter network will increase while the voltage on the other one will decrease by the same amount. The voltages change by equal amounts because medium flow causes equal changes on upstream and downstream measurements, increasing the phase angle difference between transmitter and receiver in the upstream case and decreasing the phase angle difference by the same amount in the downstream case. If the change in voltage is assumed to be 5 volts, one filter network will increase to a voltage of 15 volts while the other filter voltage will decrease to a voltage of 5 volts. The voltage at the center point 35, being equal to the average value of the filter voltages, will again be 10 volts.

If now the propagation velocity of the fluid medium changes, the initial no-flow voltage on the filter networks might rise to 13 volts or fall to 3 volts or any other value. This change in the no-flow voltage has been shown to be a serious problem because of the limited linear range of operation as described in connection with Figures 2 and 3. Since the voltage at the center point 35 is dependent only upon the average no-flow voltage and remains constant in the presence of flow, this center point voltage can be used as an error signal to keep the no-flow voltage constant when the propagation velocity changes.

Figure 1 shows one method of utilizing the voltage at the center point 35 as an error signal to maintain the no-flow voltage constant. The center point error signal is fed to a difference circuit 52 which applies the difference between the no-flow voltage and a reference voltage to a reactance tube circuit 54. Circuits for taking the difference between two voltages are well known in the art. The reactance tube controls the oscillation frequency of the transmitting oscillator 11 by conventional means such as shown in "Electronic and Radio Engineering," 4th edition, by F. E. Terman, page 601. The magnitude of the reference voltage applied to the difference circuit 52 is set equal to the preferred no-flow voltage on the filter networks. The preferred no-flow voltage corresponds to the operating point P in Figure 2.

In operation, the voltage at the center point 35 is compared with the reference voltage 50 by the difference circuit 52, the difference being applied to the reactance tube circuit 54. The sign of the difference voltage indicates the direction the correction should take. When the propagation velocity changes, the frequency of the oscillator 11 will change so that the no-flow voltage remains substantially constant at the reference voltage.

Those in the art will understand that effectively, this is the same as saying that the wavelength distance between transmitter and receiver remains substantially constant.

In most practical applications the main cause of changes in propagation velocity is temperature, and when this is the only significant factor, the change in the voltage at the center point 35 can be used as a measure of temperature. A possible way of measuring this change in voltage would be to measure the frequency shift required to maintain the no-flow voltage constant. Those in the art will also be aware that these changes in the frequency of the oscillator 11 can also be used to completely compensate for changes in calibration caused by propagation velocity changes. Keeping constant the wavelength distance between transmitter and receiver provides only partial compensation as described previously. By using these frequency changes to correct the calibration, complete compensation is now possible.

It will be apparent that the embodiments shown are only exemplary and that various modifications can be made in construction and arrangement within the scope of the invention as defined in the appended claims.

We claim as our invention:

1. In combination with an apparatus for measuring the velocity of flow of a fluid medium, said apparatus comprising two transducers mounted in spaced relation with respect to the direction of fluid flow, means for energizing said transducers so that a sound wave is alternately transmitted and received through said fluid medium in upstream and downstream directions between said two transducers, means for measuring a first phase angle difference between transmitted and received signals in the upstream direction and a second phase angle difference in the downstream direction, means for producing a first D.-C. voltage proportional to said first phase angle difference and a second D.-C. voltage proportional to said second phase angle difference, and means for measuring the voltage difference between said first and second D.-C. voltages, said voltage difference being a measure of the velocity of flow of said fluid medium; the improvement comprising: two substantially equal resistors connected in series between said first and second D.-C. voltages, the voltage at the connection point between said two resistors being substantially equal to the average voltage of said first and second D.-C. voltages, said average voltage at said connection point varying in response to changes in the propagation velocity of said fluid medium, a reference voltage substantially equal to a preferred average voltage, a reactance tube means connected to said first mentioned means for controlling the frequency of said sound wave, and means for applying the difference between said reference voltage and the voltage at said connection point to said reactance tube means so that said reactance tube means changes the frequency of said sound wave in a direction which will reduce the difference between said reference voltage and the voltage at said connection point, a change in the propagation velocity of said fluid medium thereby causing said reactance tube means to change the frequency of said sound wave so the wavelength distance between said transducers remains essentially constant.

2. In combination with an apparatus for measuring the velocity of flow of a fluid medium, said apparatus comprising two transducers mounted in spaced relation with respect to the direction of fluid flow, means for energizing said transducers so that a sound wave is alternately transmitted and received through said fluid medium in upstream and downstream directions between said two transducers, means for measuring a first phase angle difference between transmitted and received signals in the upstream direction and a second phase angle difference in the downstream direction, means for producing a first D.-C. voltage proportional to said first phase angle difference and a second D.-C. voltage proportional to said second phase angle difference, and means for measuring the voltage difference between said first and second D.-C. voltages, said voltage difference being a measure of the velocity of flow of said fluid medium; the improvement comprising: circuit means connected to said first and second D.-C. voltages for producing at its output a voltage substantially equal to the average voltage of said first and second D.-C. voltages, said average voltage at the output of said circuit means varying in response to changes in the propagation velocity of said fluid medium, a reference voltage substantially equal to a preferred average voltage, a frequency-changing means connected to said first mentioned means for controlling the frequency of said sound wave, and means for applying the difference between said reference voltage and the voltage at the output of said circuit means to said frequency-changing means so that said frequency-changing means changes the frequency of said sound wave in a direction which will reduce the difference between said reference voltage and the voltage at the output of said circuit means, a change in the propagation velocity of said fluid medium thereby causing said frequency-changing means to change the frequency of said sound wave so that the wavelength distance between said transducers remains essentially constant.

References Cited in the file of this patent

UNITED STATES PATENTS

| | | |
|---|---|---|
| 2,480,646 | Grabau | Aug. 30, 1949 |
| 2,724,269 | Kalmus | Nov. 22, 1955 |
| 2,746,291 | Swengel | May 22, 1956 |
| 2,746,480 | Hildyard | May 22, 1956 |
| 2,758,663 | Snavely | Aug. 14, 1956 |

FOREIGN PATENTS

| | | |
|---|---|---|
| 603,644 | Great Britain | June 21, 1948 |
| 623,022 | Great Britain | May 11, 1949 |